(12) United States Patent
Hall et al.

(10) Patent No.: US 7,098,802 B2
(45) Date of Patent: Aug. 29, 2006

(54) SIGNAL CONNECTION FOR A DOWNHOLE TOOL STRING (75) Inventors: David R. Hall, Provo, UT (US); H. Tracy Hall, Jr., Provo, UT (US); David S. Pixton, Lehi, UT (US); Kline Bradford, Orem, UT (US); Joe Fox, Spanish Fork, UT (US); Michael Briscoe, Lehi, UT (US)

(73) Assignee: IntelliServ, Inc., Provo, UT (US)

( * ) Notice: Subject to any disclaimer, the term of this patent is extended or adjusted under 35 U.S.C. 154(b) by 536 days.

(21) Appl. No.: 10/315,263

(22) Filed: Dec. 10, 2002

(65) Prior Publication Data
US 2004/0113808 A1 Jun. 17, 2004

(51) Int. Cl.
*G01V 3/00* (2006.01)
*G08C 19/16* (2006.01)
*E21B 47/00* (2006.01)

(52) U.S. Cl. ............................. 340/854.3; 340/853.1; 340/854.4; 340/854.6; 340/854.7; 340/854.8; 340/870.1; 73/152.01; 166/250.01

(58) Field of Classification Search ............ 340/853.7, 340/854.4, 854.6, 854.8, 870.01, 853.1, 854.7, 340/854.3, 870.1, 870.31; 73/152.01; 166/250.01
See application file for complete search history.

(56) References Cited

U.S. PATENT DOCUMENTS

| 749,633 A | 1/1904 | Seeley |
|---|---|---|
| 2,178,931 A | 11/1939 | Crites et al. |
| 2,197,392 A | 4/1940 | Hawthorn |
| 2,249,769 A | 7/1941 | Leonardon |
| 2,301,783 A | 11/1942 | Lee |
| 2,354,887 A | 8/1944 | Silverman et al. |
| 2,379,800 A | 7/1945 | Hare |
| 2,414,719 A | 1/1947 | Cloud |
| 2,531,120 A | 11/1950 | Feaster |
| 2,633,414 A | 3/1953 | Boivinet |
| 2,659,773 A | 11/1953 | Barney |
| 2,662,123 A | 12/1953 | Koenig, Jr. |
| 2,748,358 A | 5/1956 | Johnston |
| 2,974,303 A | 3/1961 | Dixon |
| 2,982,360 A | 5/1961 | Morton et al. |
| 3,079,549 A | 2/1963 | Martin |
| 3,090,031 A | 5/1963 | Lord |
| 3,170,137 A | 2/1965 | Brandt |

(Continued)

FOREIGN PATENT DOCUMENTS

EP 0399987 A1 11/1990

(Continued)

*Primary Examiner*—Jeffery Hofsass
*Assistant Examiner*—Sisay Yacob
(74) *Attorney, Agent, or Firm*—Jeffery E. Daly; Tyson J. Wilde (57) ABSTRACT

A signal transmission connection for a tool string used in exploration and production of natural resources, namely: oil, gas, and geothermal energy resources. The connection comprises first and second annular elements deployed in cooperative association with each other. The respective elements comprise inductive transducers that are capable of two-way signal transmission between each other, with downhole components of the tool string, and with ground-level equipment. The respective inductive transducers comprise one or more conductive loops housed within ferrite troughs, or within ferrite trough segments. When energized, the conductive loops produce a magnetic field suitable for transmitting the signal. The second element may be rotational in drilling applications. The respective elements may be fitted with electronic equipment to aid and manipulate the transmission of the signal. The first element may also be in communication with the World Wide Web.

20 Claims, 7 Drawing Sheets

U.S. PATENT DOCUMENTS

| | | | |
|---|---|---|---|
| 3,186,222 A | 6/1965 | Martin | |
| 3,194,886 A | 7/1965 | Mason | |
| 3,209,323 A | 9/1965 | Grossman, Jr. | |
| 3,227,973 A | 1/1966 | Gray | |
| 3,253,245 A | 5/1966 | Brandt | |
| 3,518,608 A | 6/1970 | Papadopoulos | |
| 3,696,332 A | 10/1972 | Dickson, Jr. et al. | |
| 3,793,632 A | 2/1974 | Still | |
| 3,807,502 A | 4/1974 | Heilhecker et al. | |
| 3,879,097 A | 4/1975 | Oertle | |
| 3,930,220 A | 12/1975 | Shawhan | |
| 3,957,118 A | 5/1976 | Barry et al. | |
| 3,989,330 A | 11/1976 | Cullen et al. | |
| 4,012,092 A | 3/1977 | Godbey | |
| 4,057,781 A * | 11/1977 | Scherbatskoy | 340/854.4 |
| 4,087,781 A | 5/1978 | Grossi et al. | |
| 4,095,865 A | 6/1978 | Denison et al. | |
| 4,121,193 A | 10/1978 | Denison | |
| 4,126,848 A | 11/1978 | Denison | |
| 4,215,426 A | 7/1980 | Klatt | |
| 4,220,381 A | 9/1980 | Van der Graaf | |
| 4,348,672 A | 9/1982 | Givler | |
| 4,445,734 A | 5/1984 | Cunningham | |
| 4,496,203 A | 1/1985 | Meadows | |
| 4,537,457 A | 8/1985 | Davis, Jr. et al. | |
| 4,578,675 A * | 3/1986 | MacLeod | 340/853.7 |
| 4,605,268 A | 8/1986 | Meador | |
| 4,660,910 A | 4/1987 | Sharp et al. | |
| 4,683,944 A | 8/1987 | Curlett | |
| 4,698,631 A | 10/1987 | Kelly, Jr. et al. | |
| 4,722,402 A | 2/1988 | Weldon | |
| 4,785,247 A | 11/1988 | Meador et al. | |
| 4,788,544 A | 11/1988 | Howard | |
| 4,806,928 A | 2/1989 | Veneruso | |
| 4,884,071 A | 11/1989 | Howard | |
| 4,901,069 A | 2/1990 | Veneruso | |
| 4,914,433 A | 4/1990 | Galle | |
| 4,924,949 A | 5/1990 | Curlett | |
| 5,008,664 A | 4/1991 | More et al. | |
| 5,050,675 A * | 9/1991 | Upchurch | 166/373 |
| 5,052,941 A | 10/1991 | Hernandez-Marti et al. | |
| 5,148,408 A | 9/1992 | Matthews | |
| 5,248,857 A | 9/1993 | Ollivier | |
| 5,278,550 A | 1/1994 | Rhein-Knudsen et al. | |
| 5,302,138 A | 4/1994 | Shields | |
| 5,311,661 A | 5/1994 | Zifferer | |
| 5,332,049 A | 7/1994 | Tew | |
| 5,334,801 A | 8/1994 | Mohn | |
| 5,371,496 A | 12/1994 | Tanamachi | |
| 5,454,605 A | 10/1995 | Mott | |
| 5,455,573 A * | 10/1995 | Delatorre | 340/854.8 |
| 5,505,502 A | 4/1996 | Smith et al. | |
| 5,517,843 A | 5/1996 | Winship | |
| 5,521,592 A | 5/1996 | Veneruso | |
| 5,568,448 A | 10/1996 | Tanigushi et al. | |
| 5,650,983 A | 7/1997 | Kondo et al. | |
| 5,691,712 A | 11/1997 | Meek et al. | |
| 5,743,301 A | 4/1998 | Winship | |
| RE35,790 E | 5/1998 | Pustanyk et al. | |
| 5,810,401 A | 9/1998 | Mosing et al. | |
| 5,833,490 A | 11/1998 | Bouldin | |
| 5,853,199 A | 12/1998 | Wilson | |
| 5,856,710 A | 1/1999 | Baughman et al. | |
| 5,898,408 A | 4/1999 | Du | |
| 5,908,212 A | 6/1999 | Smith et al. | |
| 5,924,499 A | 7/1999 | Birchak et al. | |
| 5,942,990 A | 8/1999 | Smith et al. | |
| 5,955,966 A | 9/1999 | Jeffryes et al. | |
| 5,959,547 A | 9/1999 | Tubel et al. | |
| 5,971,072 A | 10/1999 | Huber et al. | |
| 6,030,004 A | 2/2000 | Schnock et al. | |
| 6,041,872 A | 3/2000 | Holcomb | |
| 6,045,165 A | 4/2000 | Sugino et al. | |
| 6,046,685 A * | 4/2000 | Tubel | 340/853.2 |
| 6,057,784 A | 5/2000 | Schaaf et al. | |
| 6,104,707 A | 8/2000 | Abraham | |
| 6,108,268 A | 8/2000 | Moss | |
| 6,123,561 A | 9/2000 | Turner et al. | |
| 6,141,763 A | 10/2000 | Smith et al. | |
| 6,173,334 B1 | 1/2001 | Matsuzaki et al. | |
| 6,177,882 B1 | 1/2001 | Ringgenberg et al. | |
| 6,188,223 B1 | 2/2001 | van Steenwyk et al. | |
| 6,192,988 B1 * | 2/2001 | Tubel | 166/313 |
| 6,196,335 B1 | 3/2001 | Rodney | |
| 6,209,632 B1 | 4/2001 | Holbert et al. | |
| 6,223,826 B1 | 5/2001 | Chau et al. | |
| 6,367,565 B1 | 4/2002 | Hall | |
| 6,392,317 B1 | 5/2002 | Hall et al. | |
| 6,405,795 B1 | 6/2002 | Holbert et al. | |
| 6,641,434 B1 | 11/2003 | Boyle et al. | |
| 6,655,464 B1 | 12/2003 | Chau et al. | |
| 6,670,880 B1 | 12/2003 | Hall et al. | |
| 6,717,501 B1 | 4/2004 | Hall et al. | |
| 2002/0135179 A1 | 9/2002 | Boyle et al. | |
| 2002/0193004 A1 | 12/2002 | Boyle et al. | |
| 2003/0070842 A1 | 4/2003 | Bailey et al. | |
| 2003/0213598 A1 | 11/2003 | Hughes | |
| 2004/0027252 A1* | 2/2004 | Hudson | 340/855.1 |
| 2004/0075566 A1* | 4/2004 | Stepanik et al. | 340/632 |

FOREIGN PATENT DOCUMENTS

| | | |
|---|---|---|
| WO | WO8801096 | 2/1988 |
| WO | WO9014497 | 11/1990 |

* cited by examiner

SIGNAL CONNECTION FOR A DOWNHOLE TOOL STRING

This invention was made with government support under Contract No. DE-FC26-01NT41229 awarded by the U.S. Department of Energy. The government has certain rights in the invention.

BACKGROUND OF THE INVENTION

Generally, this invention relates to the transmission of a signal in association with all or part of a tool string used in drilling oil, gas, and geothermal wells and for all or part of a tool string used in a production well. More particularly, this invention relates to a connection apparatus comprising fixed and rotating inductive transducers that are in communication with each other, a network of downhole inductive transducers along the tool string, and with ground-level equipment, including the World Wide Web.

For more than 50 years proposals have been made for transmitting an electronic signal along the length of the tool string used in the exploration and production of useful hydrocarbons and subterranean energy sources, namely oil, gas, and geothermal energy sources. These proposals have not met with commercial success for reasons associated with the numerous technological obstacles that must be hurdled in order to achieve efficient and reliable connections across the hundreds of tool string components that are required to successfully reach and acquire the underground energy resources. For example, a tool string for an oil well is likely to require hundreds of approximately 30-foot drill pipe segments interconnected at tool joints. In addition to the drill pipe, a series of heavy-weight drill pipe and drill collars may be required to give stability to the string. Moreover, such tools as swivels, reamers, jars, pumps, motors, perforators, turbines, mud-pulse sirens, directional drilling subs, and drill bits are also required in the makeup of a modern-day tool drill string. Each of these tools requires special adaptation for signal transmission in the harsh subterranean environment, which is characterized by high temperatures, vibrations, rotational accelerations, invasive and abrasive fluids, and dynamic stresses associated with suspending a million pounds of drill string components from the surface drill rig.

In a production well similar obstacles are present. A production well may also comprise hundreds of lengths of the interconnected casing and production pipe segments as well as pumps and motors for delivering oil, gas, or geothermal energy resources to the surface. Additionally, high temperatures, fluids and corrosive gases mixed with abrasive particles combine to make the production environment an equally harsh environment for electronic components.

In response to these obstacles, the applicants have invented a network system for signal transmission downhole. The linking element in this system is an inductive transducer which does not rely on rotational orientation and direct contact in order to transmit a signal from one jointed component to another. The inductive transducer is the subject of U.S. Pat. No. 6,392,317, and PCT Application No. 75114A1, both incorporated herein by this reference. The inductive transducer comprises inductive rings that when brought into close proximity with each other, and energized, are capable of producing a shared magnetic field suitable for transmitting the signal from one component to the other. The rings comprise a conductive, insulated wire loop housed within an insulating and magnetically conductive ferrite trough, or groove. In practice, the transducers are coupled as closely together as possible, so that the transducer can be modeled as a transmission line transformer having both capacitive and inductive properties. As a convenience for manufacturing and assembly, the ferrite trough may consist of closely spaced apart ferrite segments. The inductive transducers are normally located at each end of the downhole tool and connected by a coaxial cable or some other conductor means. Additionally, the transducers may be connected to data-gathering sensors and transmitting links at predetermined locations along the tool string in aid of exploration and production of subterranean resources. Such links also serve as signal enhancement stations for error correction and boosting as the signal journeys along the downhole network.

Since a fixed and rotational connection is required to transmit the data to and from the operating tool string, the top-hole swivel has been selected for adaptation by the applicants for signal transmission to and from the downhole network. The top-hole swivel is a key surface-mounted drill rig component in the tool string. It functions as the entry point for drilling fluids and as a load transfer point between the drill string and rig. In some cases it has been used as a data gathering point for logging the well and for monitoring drill string dynamics. When adapted for signal transmission, the swivel becomes the interface between the outside world and the downhole signal transmission network of inductive transducers. Hence, this application presents a top-hole swivel fitted with inductive transducers that are adapted for signal transmission to and from the downhole network.

SUMMARY OF THE INVENTION

A top-hole signal connection for a tool string for drilling oil, gas, and geothermal wells is presented. This invention may also be used in connection with production wells. The invention enables signal transmission during drilling for and production of energy resources as well as during periods when drilling and production are interrupted. The connection comprises annular elements deployed in association with drilling and production equipment. In a drilling application, the connection apparatus is mounted on the drill rig. In production applications, the apparatus is mounted on the well head. The first element of the apparatus is fixed to the drill rig or well head while the rotational second element is fixed to the tool string. The fixed and rotating elements comprise inductive transducers that are capable of two-way signal transmission between each other, with the network components of the tool string, and with ground-level equipment. The inductive transducers comprise one or more conductive, insulated wire loops housed within insulating and magnetically conductive ferrite troughs, or within ferrite trough segments. When energized and proximately arranged, the conductive loops produce and share a magnetic field suitable for transmitting a power and data signal. The coupling between the adjacent conductive loops may also be partly capacitive in nature. The rotating element is adapted for connection to the drill rig and for connection to the drill string. Both the fixed element and the rotating element may be fitted with electronic equipment to aid and manipulate the transmission of the signal. The fixed element may also be in communication with the World Wide Web, or the Internet.

DETAILED DESCRIPTION OF THE INVENTION

A top-hole swivel connection apparatus is presented that is adapted for the transmission of an electronic signal to and from a tool string used in the drilling of an oil, gas, or geothermal well. This invention also has application in production wells. The invention will be better understood in reference to the following detailed descriptions of the drawings. The drawings are presented by way of illustration only and are not intended to limit the bounds of the present invention. Those skilled in the art are likely to identify additional applications for the present invention. Such additional applications are included within the scope of this disclosure.

Figure 1:
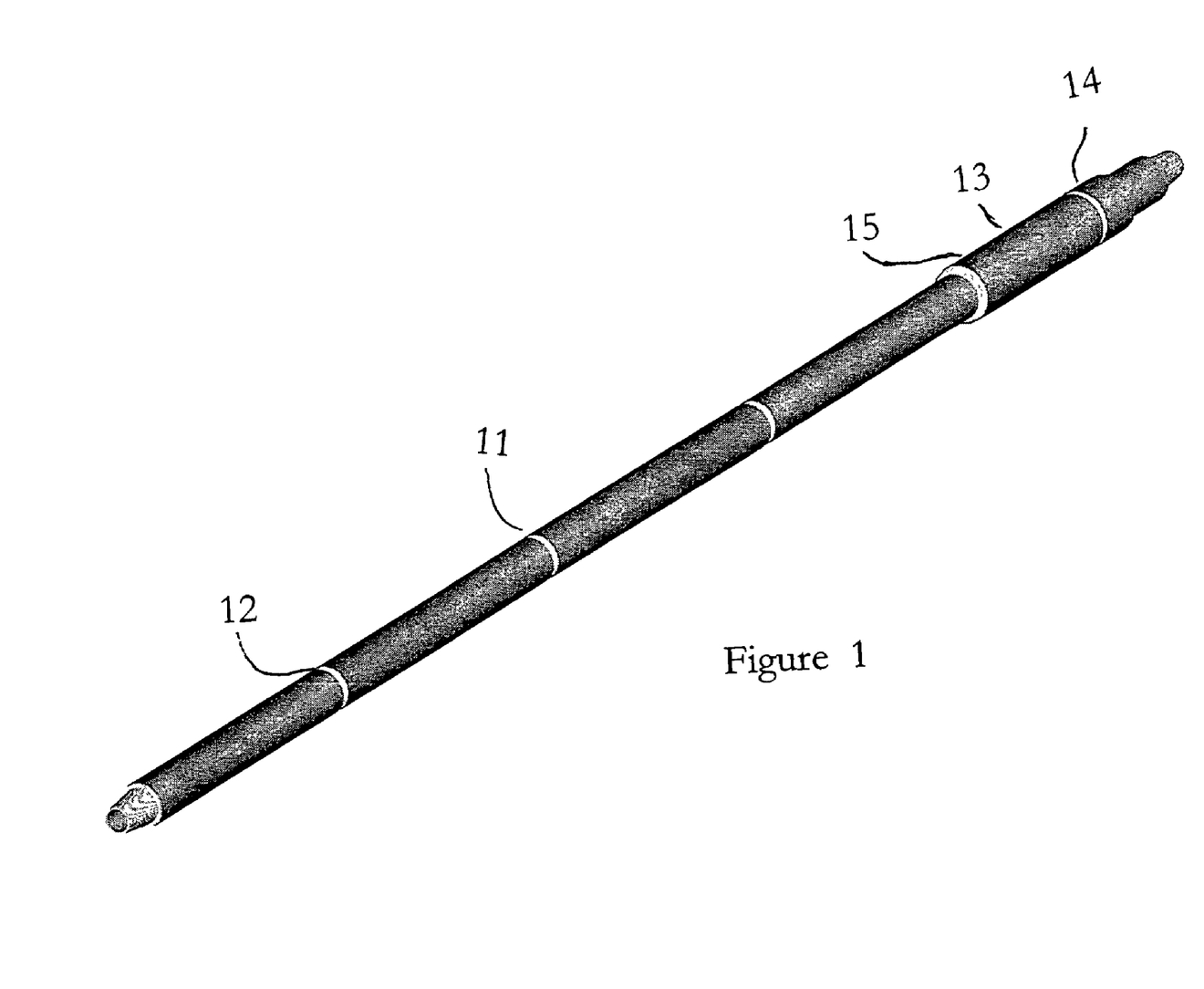
FIG. 1 is a perspective diagram of a tool string segment.

FIG. 1 is a perspective diagram of a portion of a tool string. The diagram is presented without reference to the drill rig or production head for clarity. The tool string is made up of annular segments 11 that are joined together at threaded tool joints 12. In reference to a production well, the tool string is made up of well casing, pumps, motors, sensors, and production pipe. In reference to a drill string, the tool string is made up of drill pipe and other related tools such as heavy weight drill pipe, logging equipment, sensors, formation evaluation equipment, drill collars, swivels, motors, jars, turbines, shock absorbers, reamers, blow-out preventors, steering subs, bottom hole assemblies, and drill bits. The tools used in the string must be constrained to fit within the annular well bore and accommodate attachment to the drill string so as not to interfere with the drilling or production operation. Furthermore, each tool must provide for the flow of drilling fluid from the surface to the drill bit, or for the flow of fluids and gases to and from the surface in a production well. In order to achieve signal transmission from the drill bit to the surface, each of the respective tools must be adapted for signal transmission, preferably in such manner so as not to unduly interfere with normal tool string make-up procedures. FIG. 1 also depicts a swivel joint signal connection 13 at the upper end of the string. The signal connection comprises a first fixed element 14 and a second rotational element 15. In production well applications, the second element may not be required to rotate, and therefore may also be fixed to the well head. In exploration applications, the swivel joint is normally attached to or suspended from the drill rig and serves as an entry point for the drilling fluid. When fitted with signal transmission means, the first and second elements become the interface between the tool string network and the outside world.

Figure 2:
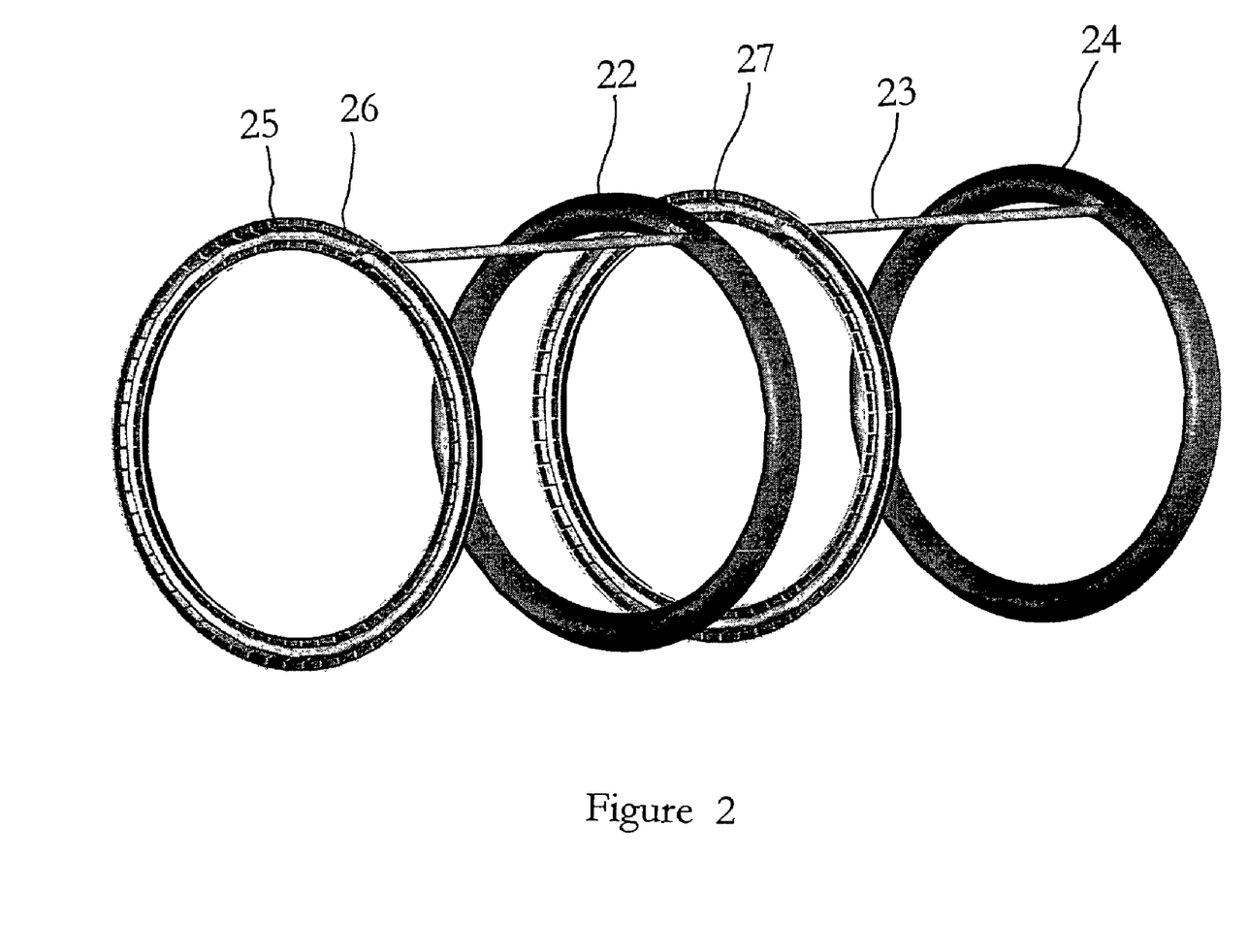
FIG. 2 is a perspective diagram of an embodiment of a network of inductive transducers for use in a tool string.

FIG. 2 is a diagram of a downhole signal transmission network comprising inductive transducers 22. The transducers are disposed in the shoulders of the respective tool joints and electrically joined by means of conductors 23 running the length of the tool string segments. The conductors 23 are preferably coaxial conductors running along the inside wall of the downhole tool and are housed within a metal conduit in order to protect them from the abrasive drilling fluid and other tools circulated through the bore of the tool string. The transducers 22 comprise an annular housing 24 in which is fixed a mating u-shaped, fully dense, ferrite trough 25, or fully dense trough segments 26, that open outwardly of the tool joint. An insulated conductor 27 is mechanically or chemically secured at the bottom of the trough and connected to the conductors 23. The insulated conductor and the ferrite trough, or trough segments, are hermetically sealed against contamination using a non-porous, high-temperature polymer, a fully dense non-conductive ceramic, or a non-porous composite material. The inductive transducers, together with their coaxial interconnects, provide a non-contact network for the transmission of a signal along the full length of the tool string.

Figure 3:
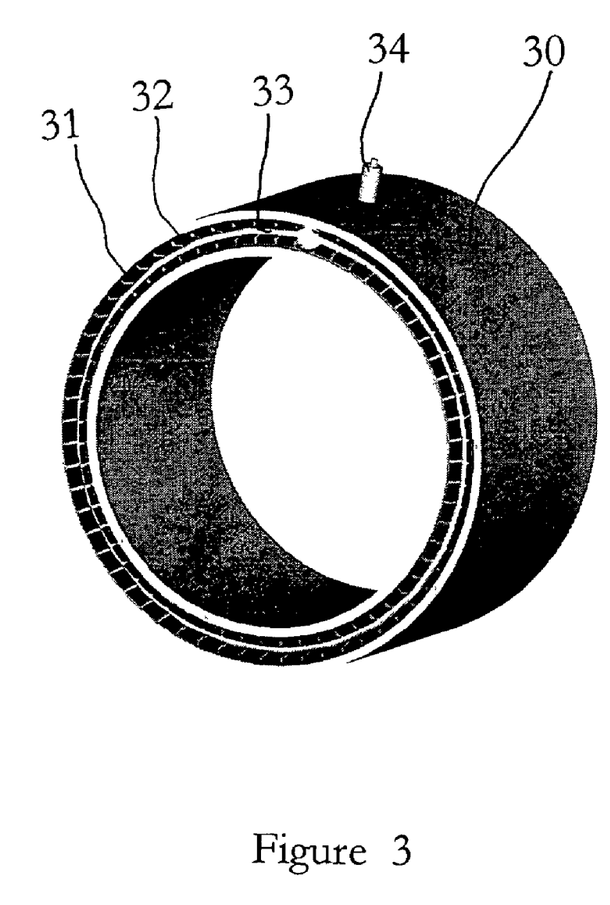
FIG. 3 is a perspective diagram of an embodiment of the first element of the present invention.

FIG. 3 is a diagram of an embodiment of the first element of the signal connection of the present invention. The first element is normally fixed to the drill rig or production head. It comprises an annular ring, or collar, 30 which is provided with a shoulder groove 31 in which is installed the inductive transducer 32. An insulated wire 33 laid and fixed within the trough of the transducer serves as the energizing coil for the transducer. When this coil is brought into close proximity with a mating coil of the second element, and energized, an electromagnetic field is generated suitable for signal transmission. An opening (not shown) in the wall of the element is provided to permit connection of the wire to a coaxial connector 34. Transmission means from the connector 34 may comprise an antenna, a cable, or an optical sensor/emitter that will permit communication of the signal to the outside world.

Figure 4:
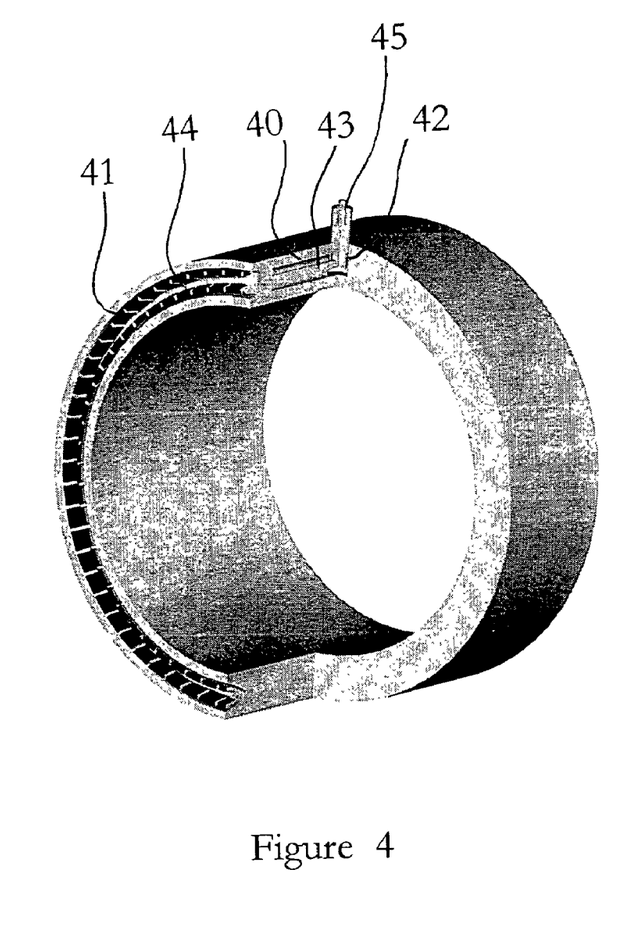
FIG. 4 is a section diagram of the embodiment of the first element of FIG. 3.

FIG. 4 is a diagram of a sectioned view of the first element shown in FIG. 3. It depicts an opening 40 in the wall of the element that joins groove 41 with a perpendicular opening 42 through the outside wall of the element. A cable 43 runs through the respective openings 40 and 42 providing a connection between the coil 44 and connector 45. Connector 45 may then be attached to an antenna, cable, or other suitable conductor for communication of the signal between the outside world and the downhole network.

Figure 5:
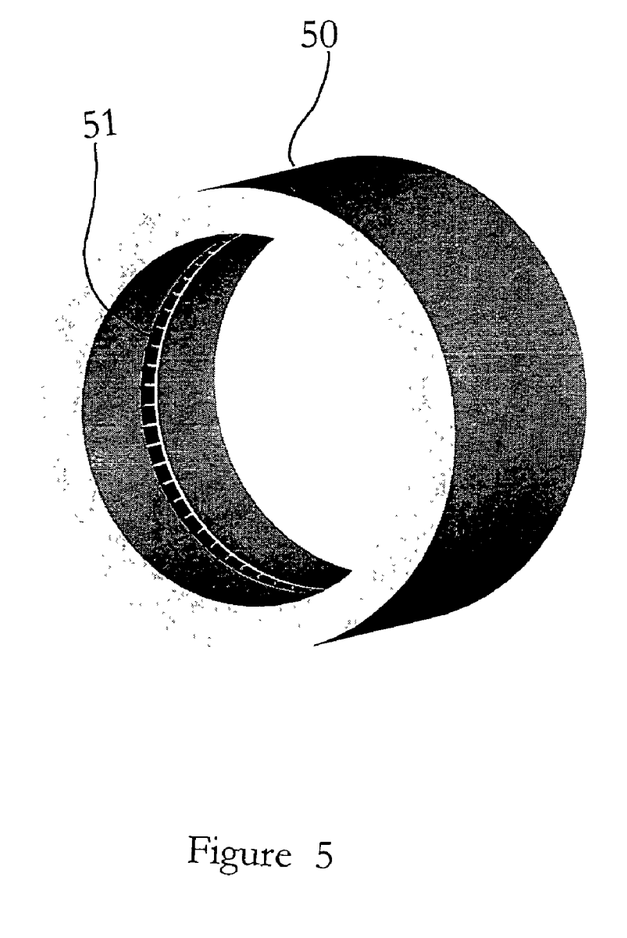
FIG. 5 is a perspective diagram of an alternate embodiment of the first element of the present invention.

FIG. 5 is an alternate embodiment of the first element of the signal connection. It features an annular body 50 that is provided with a radially oriented inductive transducer 51 of the present invention housed within the inside wall of the element. The transducer 51 would then be aligned with a mating transducer in the outside wall of the second element.

Figure 6:
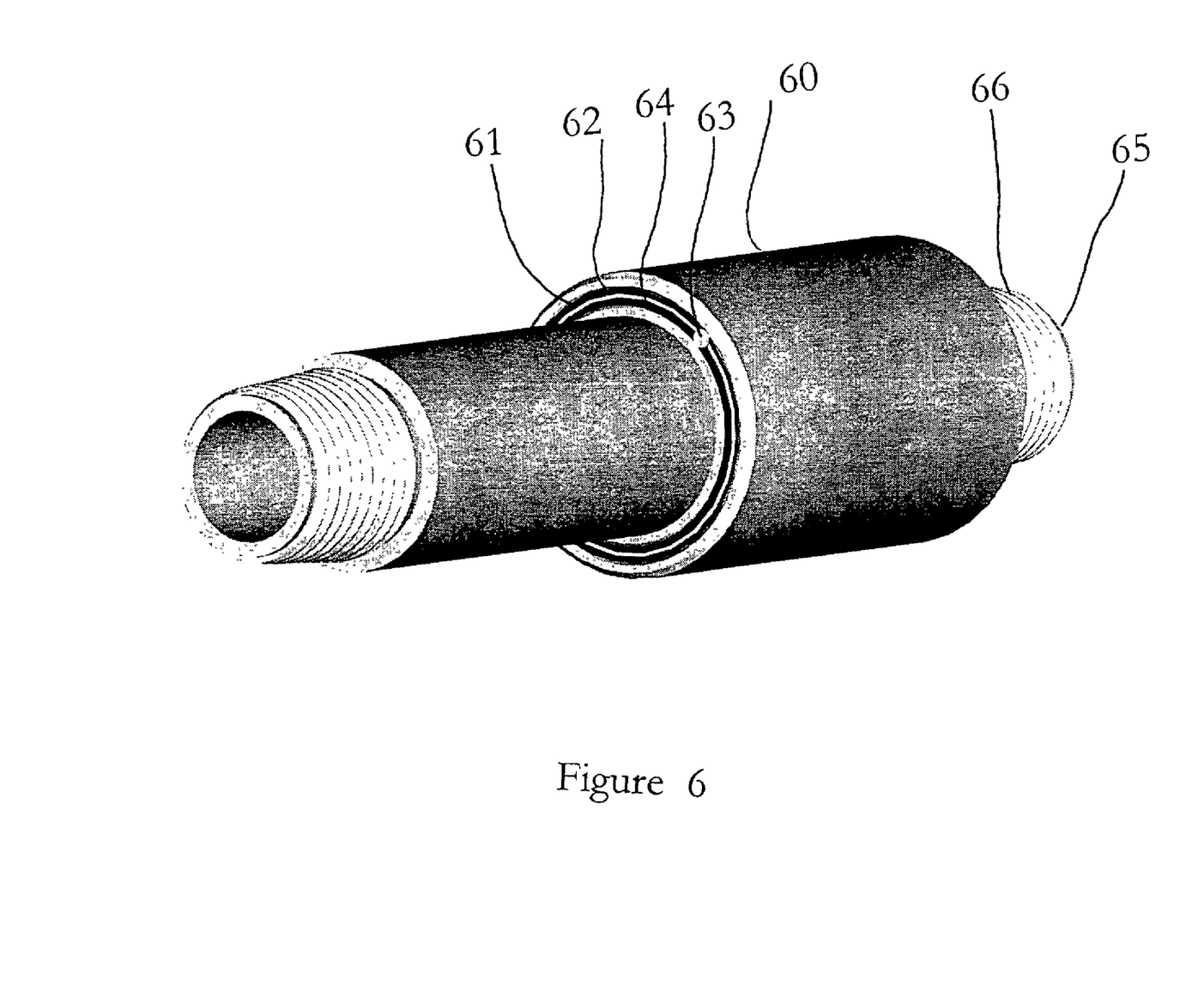
FIG. 6 is a perspective diagram of an embodiment of the second element of the present invention.

FIG. 6 is a perspective diagram of an embodiment of the second element of the present invention. Depending on the application, the second element may be rotational. It features a body 60 suitable for attachment to drill string components. A groove 61 is provided in an external shoulder of the body 60 for housing the inductive transducer 62. A connection 63 is provided in an opening in the body wall for attaching the coil 64 to a cable (not shown) joining the transducer 62 to a third inductive transducer 65 located in the secondary shoulder of the second element's pin-end tool joint 66.

Figure 7:
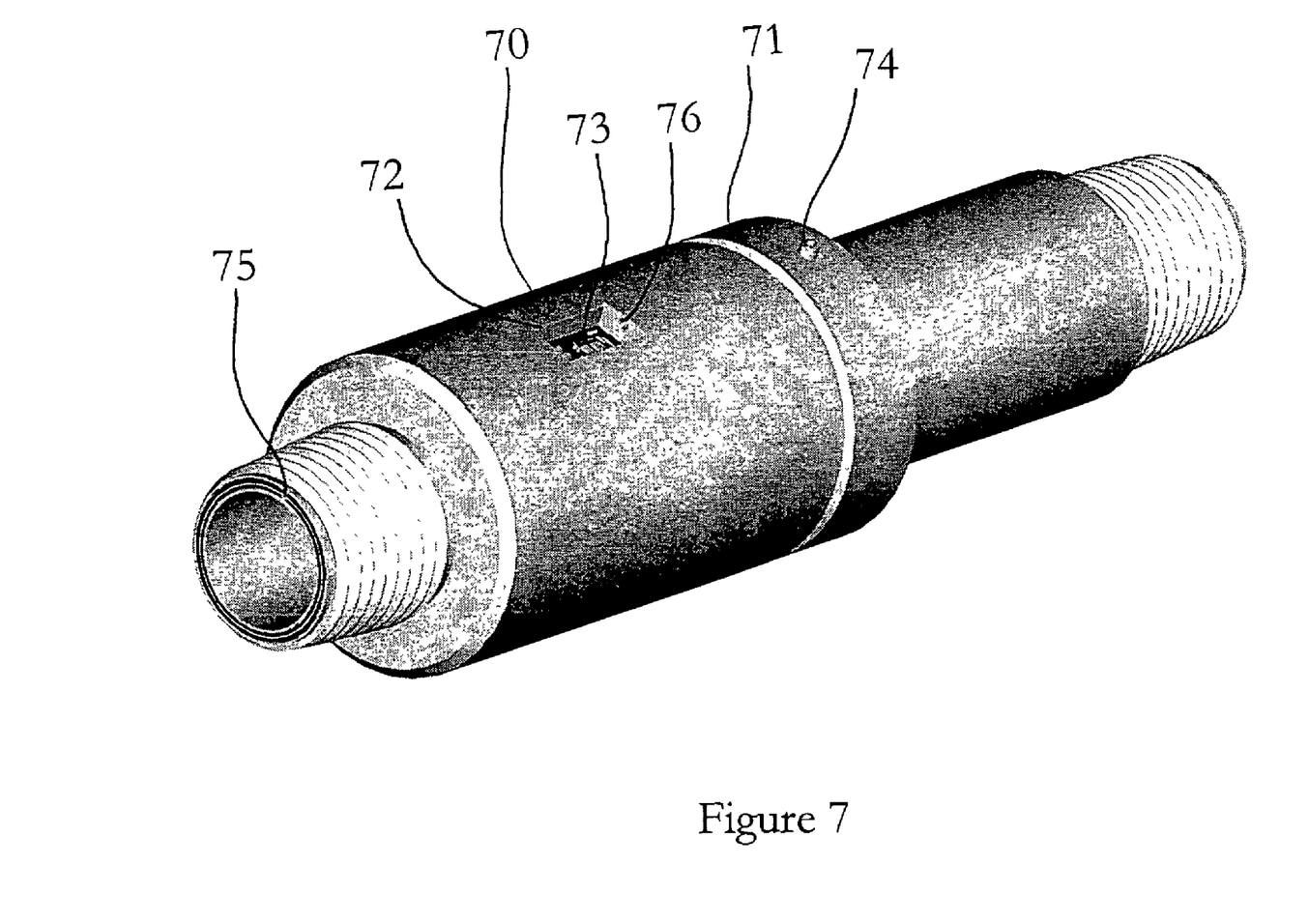
FIG. 7 is a perspective diagram of an embodiment of the first and second elements deployed in cooperative association.

FIG. 7 is a perspective diagram of an embodiment of the present invention depicting a rotational second element body 70, suitable for attachment to a tool string, cooperatively arranged with a fixed first element 71 for transmission of a signal from the tool string to the outside world. The inductive transducers providing communication between the first and second elements are not shown, but may be positioned in the respective shoulders, or in the inside and outside walls, of the first and second elements as shown in the preceding figures. A third inductive transducer 75 is provided in the pin end tool joint of the second element in order to provide communication with a suitable mating transducer in the next joined component of the tool string. The third transducer is, thereby in communication with a network of downhole transducers so that two-way communication may be provided all along the full length of the tool string. A cavity 72 is provided in the wall of the body 70 to accommodate electronic equipment 73 that may be required to aid in signal transmission. Although not shown, a similar cavity may be provided in the wall of the first element 71 for the deployment of electronic equipment to aid in the transmission of the signal, also. An opening 76 may be provided in the wall of the first and second elements in order to facilitate the connection of the electronic equipment to the respective transducers.

What is claimed is:

1. A signal connection for a downhole tool string, comprising: coaxial first and second elements cooperatively arranged; the first element comprising a first inductive transducer in communication with surface equipment the second element comprising a mating second inductive transducer adapted to rotate relative to the first transducer while in operation; the second transducer being in communication with the first transducer; the second element further comprising a third inductive transducer in communication with the second transducer and with a network of transducers in the tool string; wherein, when the respective transducers are energized by an electronic signal, the signal is transmitted between at least a portion of the tool string and surface equipment.

2. The connection of claim 1, wherein the second element is rotational and adapted for connection to a tool string whereby a signal may be transmitted between the surface equipment and the tool string during rotation of the second element.

3. The connection of claim 1, wherein the respective inductive transducers comprise one or more inductive conductor loops housed within insulating, magnetic ferrite troughs.

4. The connection of claim 3, wherein the troughs comprise a plurality of ferrite segments.

5. The connection of claim 1, wherein the inductive transducer of the first element is in communication with surface equipment by a transmission means selected from the group consisting of radio waves, infra-red waves, optical fibers, wire, and coaxial cables.

6. The connection of claim 1, wherein the second and third transducers are in communication with each other by means of electrical conductors.

7. The connection of claim 1, wherein the signal transmitted between the respective inductive transducers is suitable for transmitting data.

8. The connection of claim 1, wherein the signal transmitted between the respective inductive transducers is suitable for transmitting power.

9. The connection of claim 1, wherein the first element comprises electronic equipment for aiding the transmission of the signal.

10. The connection of claim 1, wherein the second element comprises electronic equipment for aiding the transmission of the signal.

11. The connection of claim 1, wherein the first element is in communication with the World Wide Web, or Internet.

12. The connection of claim 1, wherein the second element comprises an externally shouldered tool joint adapted for connection to a mating tool joint.

13. The connection of claim 12, wherein the third inductive transducer is disposed within the external shoulder of the tool joint.

14. The connection of claim 1, wherein the tool string is for use in a production well.

15. The connection of claim 1, wherein the tool string is for use in drilling a well.

16. A connection in a swivel for a downhole tool string, comprising: coaxial first and second swivel elements cooperatively arranged; the first element comprising a first inductive transducer in communication with surface equipment; the second element comprising a second inductive transducer mating with and in communication with the first transducer; the second element further comprising a third inductive transducer in communication with the second transducer and with a network of transducers in the tool string; wherein, when the respective transducers are energized by an electronic signal, the signal is transmitted between at least a portion of the tool string and surface equipment.

17. The connection of claim 16, wherein the first element is an annular body with the first transducer being radially oriented within an opening formed in an inside wall of the annular body and the first transducer further being aligned with the second transducer disposed within an opening formed in an outside wall of the second element.

18. The connection of claim 16. wherein the first element is an annular body with the first transducer being disposed within an opening formed in a shoulder of the annular body.

19. The connection of claim 16, wherein the first element is fixed to a drill rig or well head while the second element is fixed to a rotational tool string.

20. The connection of claim 16, wherein the first element comprises a connector to the surface equipment, the connector being selected from the group consisting of antennas and cables.

* * * * *